United States Patent [19]
Murakami

[11] Patent Number: 6,069,981
[45] Date of Patent: May 30, 2000

[54] IMAGE CONVERSION METHOD AND RECORD MEDIUM

[75] Inventor: Shigeo Murakami, Kyoto, Japan

[73] Assignee: Dainippon Screen Mfg. Co., Ltd., Kyoto, Japan

[21] Appl. No.: 09/094,723

[22] Filed: Jun. 15, 1998

[30] Foreign Application Priority Data

| Jun. 16, 1997 | [JP] | Japan | 9-158525 |
| Jun. 16, 1997 | [JP] | Japan | 9-158526 |
| Jun. 16, 1997 | [JP] | Japan | 9-158527 |

[51] Int. Cl.$^7$ ........................................... G06K 9/40
[52] U.S. Cl. .................... 382/274; 358/518; 358/519
[58] Field of Search .................... 358/529, 487, 358/506, 509, 527, 519, 516, 518; 382/274

[56] References Cited

U.S. PATENT DOCUMENTS

| 4,812,879 | 3/1989 | Suzuki | 355/38 |
| 4,893,178 | 1/1990 | Matama et al. | 358/76 |
| 5,198,892 | 3/1993 | Misawa | 358/41 |
| 5,343,312 | 8/1994 | Hibi | 358/520 |
| 5,751,343 | 5/1998 | Hibino et al. | 348/96 |
| 5,757,430 | 5/1998 | Maeda et al. | 348/373 |
| 5,790,707 | 8/1998 | Tanaka | 382/274 |

FOREIGN PATENT DOCUMENTS

| 363073770A | 9/1986 | Japan | H04N 1/387 |

*Primary Examiner*—Jerome Grant, II
*Attorney, Agent, or Firm*—McDermott, Will & Emery

[57] ABSTRACT

A positive image which resembles an object is obtained from a negative image which has various color distributions. An image analysis part judges how far image data of a negative image are from a gray line, and finds an intensity value of one optional color which provides a point on the gray line when combined with each of other colors, to thereby identify an HP (highlight point) and an SP (shadow point) on the negative image. At this stage, a pixel at which the sum of RGB-values on the negative image is approximately the largest is defined as a first HP candidate. Maximum values in the negative image are calculated for planes of the respective colors, and one set of the RGB-values is defined as a second HP candidate. Whether the first HP candidate is close to the gray line is judged. If the first HP candidate is close to the gray line, the first HP candidate is directly used as an HP. If the first HP candidate is far from the gray line, whether the second HP candidate is close to the gray line is judged. If the second HP candidate is close to the gray line, the second HP candidate is directly used as an HP. If the second HP candidate is far from the gray line, RGB-values in a white and a black regions in a gray scale are used as an HP and an SP. An image conversion part converts the negative image which is read from an image holding part into image data of a positive image which has a proper contrast, based on information regarding the HP and the SP on the negative image supplied from the image analysis part.

8 Claims, 10 Drawing Sheets

IMAGE CONVERSION METHOD AND RECORD MEDIUM

BACKGROUND OF THE INVENTION

1. Field of the Invention

The present invention relates to a method of converting a negative image into a positive image, which is needed in order to execute various types of image processing based on a negative film, e.g., when a negative image of a negative film is read by a scanner and a printed matter printing a positive image is to be created. The present invention relates also to a record medium for recording a program which is used to execute such an image conversion method on a computer.

2. Description of the Background Art

A positive film allows to recognize the contents of the film by directly looking at the film. Further, after obtaining image data through color separation in which a positive film is separated into three colors of red (hereinafter "R"), green (hereinafter "G") and blue (hereinafter "B") by image inputting equipment such as a scanner, it is easy to reproduce and display an image which corresponds to the image data on a monitor or the like.

On the other hand, a negative film does not allow to grasp the contents of the film unless a negative image of an object which is photographed on the film is somehow reversed into a positive image. While it is considered that a quality of a positive image which is obtained by an image inversion method of reversing a negative image into a positive image is largely affected by whether the image inversion method is appropriate or not, there is no document available which discloses a specific image inversion method of inverting an image through electric image processing.

An image inversion method as above may be as follows. For example, after separating a negative film through color separation into three colors of R, G and B with a scanner and reading image data of a negative image, intensity conversion for reversing brightness and darkness is executed by electrical signal processing, whereby a highlight point and a shadow point for each color in the negative image as it is before inversion are correlated with a highlight point and a shadow point for each color in the positive image as it is after inversion. As herein termed, with respect to a negative image, a "highlight point" refers to a point which is to be expressed as the brightest point in a positive image which is obtained by inversion, and a "shadow point" refers to a point which is to be expressed as the darkest point in the positive image which is obtained by inversion.

Describing the intensity conversion mentioned above more precisely, intensity conversion formulas each in the form of a direct function is established for converting minimum values for the respective colors of image data which are obtained from a negative image into maximum values for the respective colors of image data of a positive image and for converting maximum values for the respective colors of the image data which are obtained from the negative image into minimum values for the respective colors of the image data of the positive image. Data conversion is executed which applies the intensity conversion formulas to data of each pixel in the negative image, thereby obtaining a positive image which is inversion of the negative image.

However, when combination of highlight points for the respective colors of a negative image as it is before inverted is a relatively bright chromatic color, the method as described above does not permit to evenly invert the chromatic color, and therefore, it is not possible to obtain a positive image which resembles an object.

Further, the method as described above does not necessarily guarantee that a bright white portion in an object, for example, becomes a highlight point in a negative image. The bright white portion in the object may be colored, in which case it is not possible to obtain a positive image which resembles the object.

This problem is considered to be because of a characteristic called an inter-image effect which is ascribed by a manufacturer to a negative film for the purpose of brightly reproducing R, G and B.

This characteristic produces an effect that color development densities of R, G and B increase when a film is exposed with separated light of R, G and B rather than when the film is exposed with white light. That is, when an object contains a white portion and a highly color saturated portion, but for the inter-image effect, a density of the white portion becomes the highest with respect to R, G and B. The inter-image effect, however, increases a B-density in a highly color saturated portion of a blue color higher than a B-density in the white portion, for example. The expression a "high (dark) density" is herein used in the context of a negative image, and therefore, in the case of a positive image, refers to a bright portion. As described above, a B-value of RGB-values on a negative image of a blue color plane, for instance, becomes much smaller than a B-value of RGB-values on the negative image of a white color plane in some cases, which in turn gives slight R- and G-tints to the white color plane.

SUMMARY OF THE INVENTION

The present invention is directed to a method of converting a negative image recorded on a negative image-recording medium into a positive image using a predetermined image-conversion rule.

According to the present invention, the method comprises the steps of: a) determining a gray condition defining achromatic colors on the negative imagerecording medium; b) determining a first combination of color components in a brightest region on the negative image; c) determining whether or not the first combination of color components satisfies the gray condition; d) determining the image-conversion rule using the first combination of color components if the first combination of color components satisfies the gray condition; e) determining the image-conversion rule using an alternative combination of color components if the first combination of color components does not satisfy the gray condition; and f) converting the negative image into a positive image using the image-conversion rule.

Thus, if the first combination of color components does not correspond to an achromatic color, the first combination of color components is not used as highlight data representing ha highlight point. As a result, it is prevented to employ brightest but chromatic point on the negative image as a highlight point, and accordingly, the negative image is desirably converted into a positive image.

Preferably, the step a) comprises the step of: a-1) determining a gray reference line in a color coordinate space representing the gray condition; and the step c) comprises the step of: c-1) determining whether or not the first combination of color components is in a neighborhood of the gray reference line.

In a preferred embodiment of the present invention, the alternative combination of color components may be obtained by respective minimum values of color components on the negative image.

If a combination of respective minimum values of color components on the negative image does not satisfy the gray condition as well as the first combination of color components, a first reference combination of color components may be used. The first reference combination of color components is previously obtained by analyzing respective color components of a white object recorded on another negative image-recording medium whose photosensitive character is the same as the negative image-recording medium.

The present invention is applied to determine a shadow data representing a shadow point on the negative image.

According to the present invention, various negative images can be appropriately converted into positive images. When a same object is recorded on a plurality of photosensitive negative films of a similar type, for example, the conversion rules do not vary among the respective negative films.

The present invention also provides a computer-readable medium carrying a program for converting a negative image recorded on a negative image-recording medium into a positive image using a predetermined image-conversion rule, wherein execution of the program by a computer system causes the computer system to perform the above-designated process.

Accordingly, an object of the present invention is to provide an image conversion method with which a negative image which has various color distributions is inverted equally for the respective colors, and a negative image which contains a colored portion and a highly color saturated portion which is close to a pure color is inverted properly for the respective colors, so that a positive image which resembles an object is obtained. The present invention also aims at providing a computer-readable medium in which a program for executing such a method is recorded.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
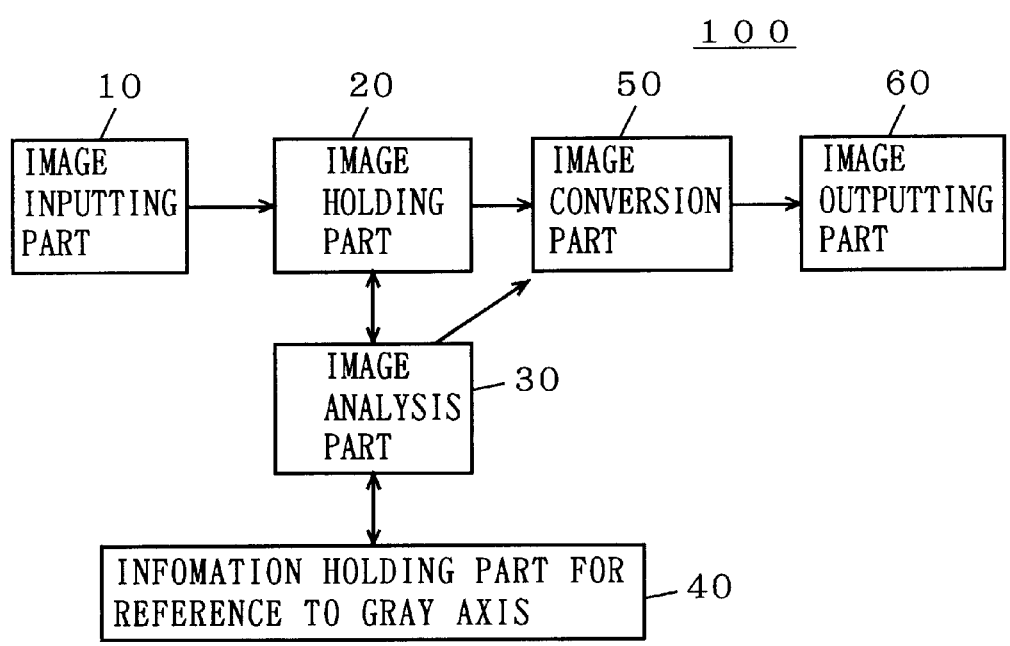
FIG. 1 is a block diagram showing a structure of an image processing apparatus for executing an image conversion method according to a first preferred embodiment of the present invention.

FIG. 1 is a schematic diagram showing a structure of an image processing apparatus for executing an image conversion method according to a first preferred embodiment of the present invention.

As shown in FIG. 1, an image processing apparatus 100 comprises an image inputting part 10 for reading a negative image which is photographed on a negative film and for converting the negative image into electric image data, an image holding part 20 for storing, depending on a necessity, image data which are supplied from the image inputting part 10, an image analysis part 30 for analyzing image data which are stored in the image holding part 20 when necessary, an information holding part 40 for holding an analysis result or the like which is obtained by the image analysis part 30, an image conversion part 50 for performing certain processing on the image data of a negative image which are stored in the image holding part 20 based on an instruction and information supplied from the image analysis part 30 and for converting the image data of the negative image into image data of a positive image, and an image outputting part 60 for outputting the image data of the positive image which are obtained by the The image inputting part 10, comprising an image reading apparatus such as a scanner, separates a negative image which is recorded on a negative film into three colors of R, 6 and B and outputs intensities in R, G and B as image data in the form of digital signals.

The image holding part 20, comprising a memory for image data, is capable of temporarily or permanently storing a plurality pieces of image data which are outputted by the image inputting part 10. In response to a certain retrieve command, the image holding part 20 sends stored image data to the image analysis part 30, the image conversion part 50 and the like.

The image analysis part 30, comprising a calculation apparatus, etc., reads image data which are stored in the image holding part 20 when necessary, and performs necessary calculation, statistical processing or the like on the image data for the purpose of analyzing the image data. More precisely, first, the image analysis part 30 determines how much image data of a negative image which is to be inverted deviates from a gray line which is found in advance with respect to a negative film of each brand (i.e., to what extent the negative image has a tint). As herein termed, a "gray line" refers to a set of R-, G- and B-intensities of image data which are obtained as the image inputting part 10 reads a negative film which records a gray scale of continuous or step-by-step changes of gray colors (achromatic colors) from sufficiently bright white to sufficiently dark black after the negative film is developed. The gray line is a straight reference line or a reference curve representing "a gray condition" defining achromatic colors on the negative film. Second, the image analysis part 30 calculates an expected intensity value of one optional color (R, for instance) which becomes a point on a gray line (image data which correspond to achromatic colors) when combined with each of the intensity values of other colors (G and B) supplied to the image analysis part 30. Third, the image analysis part 30 finds a highlight point (hereinafter an "HP") and a shadow point (hereinafter an "SP") on the negative image which is to be inverted, based on the image data of the negative image.

The information holding part 40, comprising a memory for saving various types of data, stores information which is necessary for analysis at the image analysis part 30, a result of processing, etc. For example, the information holding part 40 stores gray lines of negative films of different brands so that the gray lines can be referred to, conversion formulas which are needed to find expected intensity values in G and B which provide a point on a gray line when combined with an intensity value of R at a particular pixel.

The image conversion part 50, comprising a calculation apparatus, etc., numerically converts intensity values in R, G and B which form image data of a negative image which are read out from the image holding part 20 based on information regarding an HP and a SP on a negative image which is supplied from the image analysis part 30, whereby the image data of the negative image are converted into image data of a positive image which has a proper contrast.

The image outputting part 60, comprising a printer, a display and the like for an color image, outputs positive type image data which are received from the image conversion part 50, as an actual printed matter in color.

Figure 2:
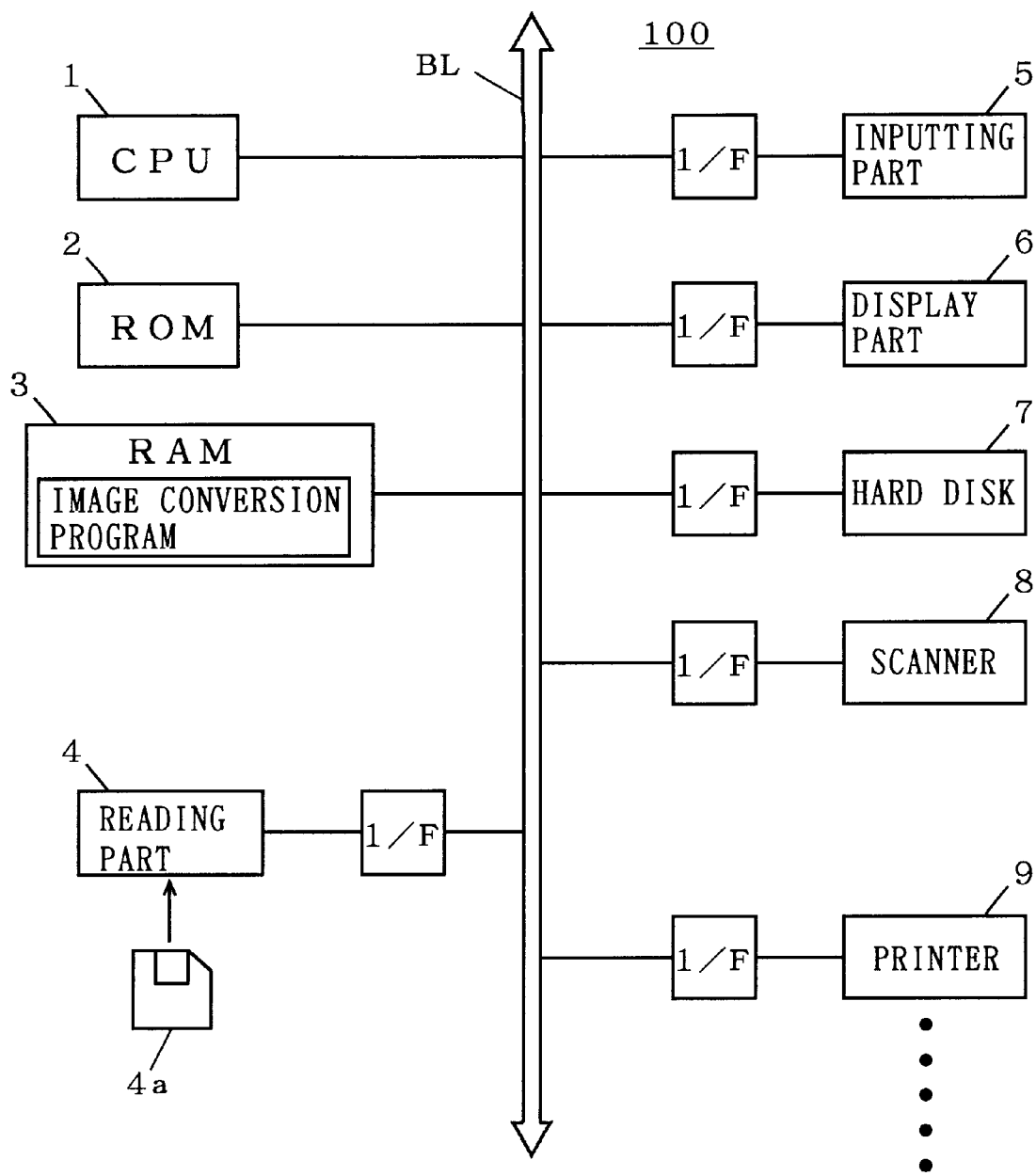
FIG. 2 is a block diagram showing a structure of a computer system which realizes the image processing apparatus according to the first preferred embodiment of the present invention.

The image processing apparatus 100 described above is a single general computer system which comprises, as main body parts, a CPU 1 such as shown in FIG. 2, a ROM 2 for storing basic programs therein, a RAM 3 for storing an image conversion program to be described in detail later, a reading part for reading out the image conversion program from a storage medium 4a such as a magnetic disk, an inputting part 5 for receiving an input from a keyboard and a mouse, a display part 6 such as a CRT display, and a hard disk 7 for storing desired programs and data, all of which are connected to each other through interfaces (I/F) as required. The computer system further comprises peripheral equipment, such as a scanner 8 and a printer 9. The image processing apparatus 100 executes the image conversion program using the CPU 1 to perform image conversion to be described later. The computer system is adapted to communicate with other apparatuses not shown through the bus line BL to exchange various data therewith. Additionally, the image conversion program may be previously stored in the ROM 2 or hard disk 7 and be used by reading and storing the image conversion program in the RAM 3. In this case, the ROM 2 or hard disk 7 functions as a storage medium.

<1. First Preferred Embodiment>

Now, image processing performed by the image processing apparatus 100 according to the first preferred embodiment will be described.

Figure 3:
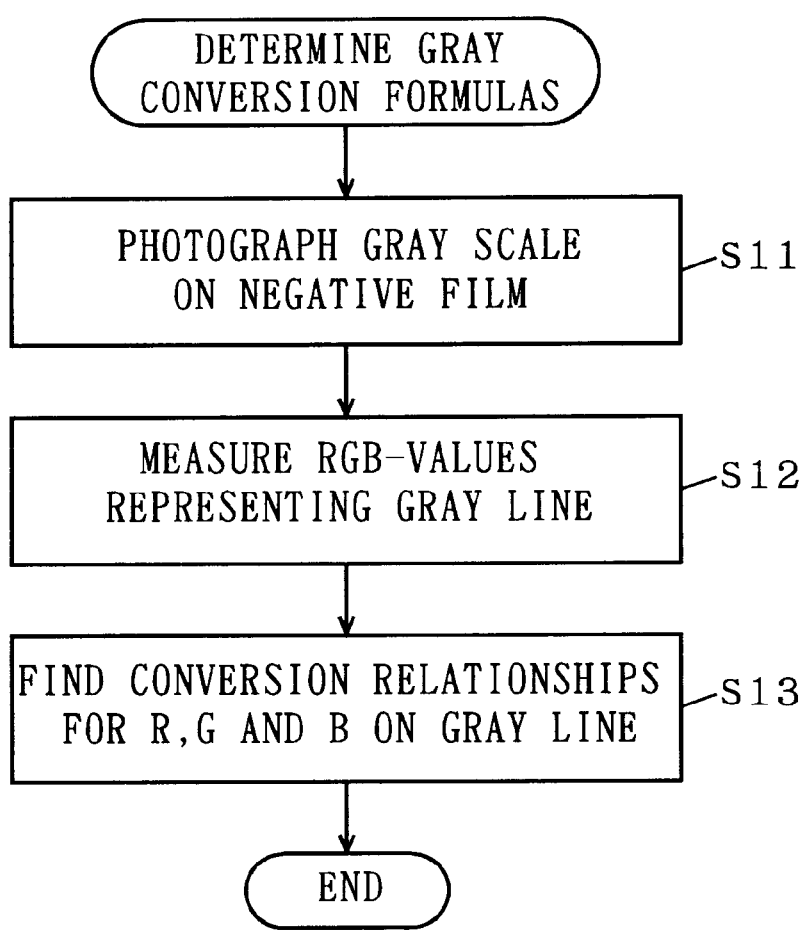
FIG. 3 is a flowchart for establishing a conversion formula for R, G and B in relation to a gray line in the image conversion method according to the first preferred embodiment of the present invention.
Figure 4:
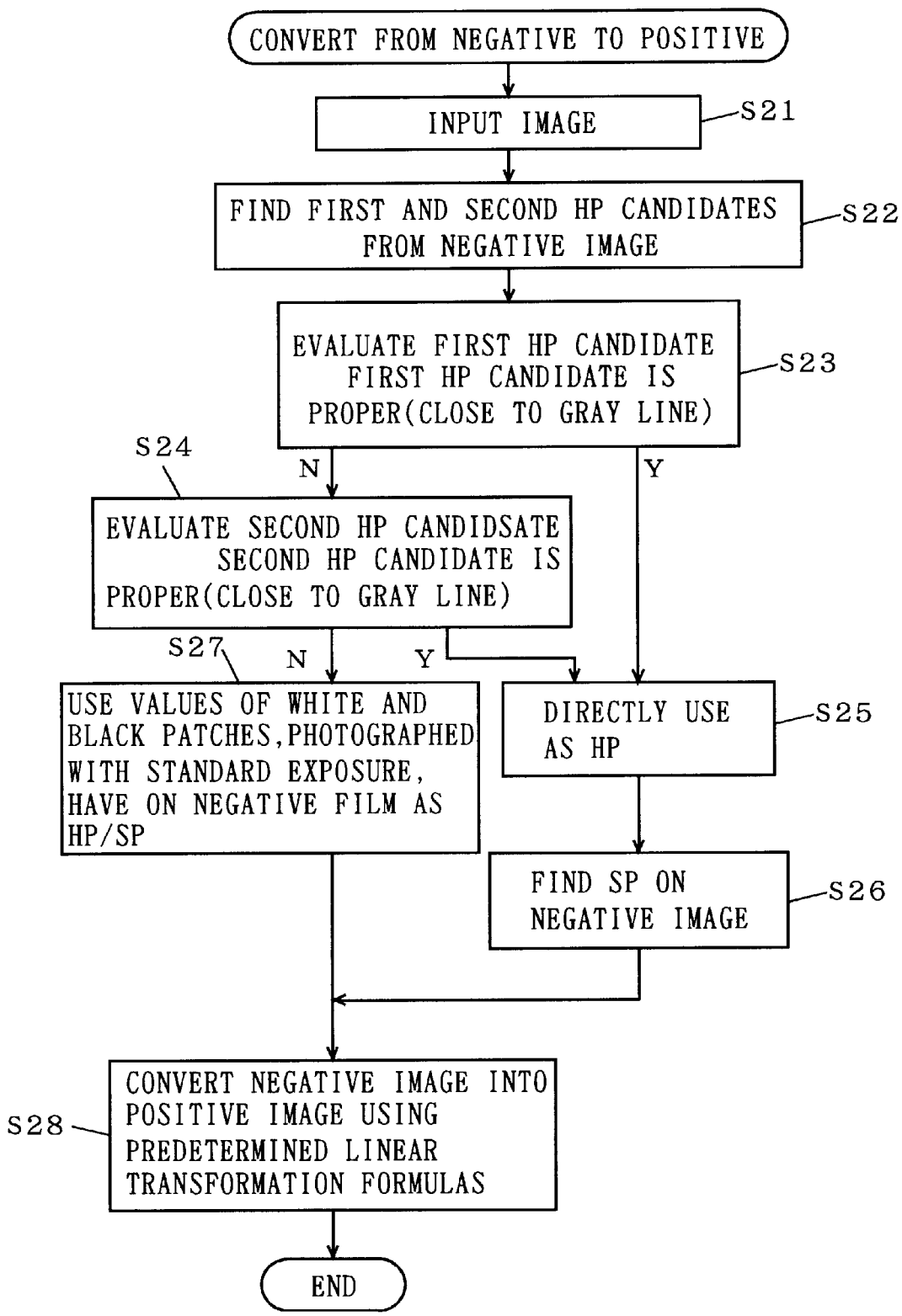
FIG. 4 is a flowchart for converting image data of a negative image into image data of a positive image according to the first preferred embodiment of the present invention.

FIGS. 3 and 4 are flowcharts for conceptually describing a series of procedures of image processing according to the first preferred embodiment, including operations of the image processing apparatus 100 which is shown in FIG. 1. FIG. 3 shows procedures for establishing conversion formulas for R, G and B in relation to a gray line, while FIG. 4 shows procedures for converting image data of a negative image into image data of a positive image.

First, at Step S11, a gray scale or a gray scale image is photographed on a negative film of a particular brand having a specific photosensitive character, and the negative film is developed. More particularly, the gray scale is irradiated with illumination light of a standard type which is designated for that brand. The gray scale is then photographed in an exposure range covering a standard exposure quantity which is designated for that brand. After photographing, the negative film is developed by a standard process which is designated for that brand. The photosensitive character of the negative film is the same as a negative film which is to be used to record an object image.

Next, at Step S12, the image inputting part 10 reads an image of the developed negative film which was obtained at Step S11, and the image which was read is saved in the image holding part 20 as image data. More precisely, the image inputting part 10 reads the image which is formed on the developed negative film on which the gray scale was photographed, as image data which are formed by digital intensity signals which represent separated colors of R, G and B, to thereby find graduated intensity values in R, G and B (hereinafter "RGB-values") of a gray line extending from the brightest white to the darkest black which are photographed on the negative film.

Next, at Step S13, conversion formulas for R, G and B are established based on the RGB-values of the gray line which was obtained at Step S12. For example, conversion formulas to establish are conversion formulas for calculating expected intensity values in G and B which provide a point on the gray line when combined with an intensity value in R (hereinafter an "R-value"), conversion formulas for calculating an expected intensity value in R which provides a point on the gray line when combined with intensity values in G and B (hereinafter respectively a "G-value" and a "B-value"), etc. The conversion formulas are thereafter stored in the information holding part 40.

Figure 5:
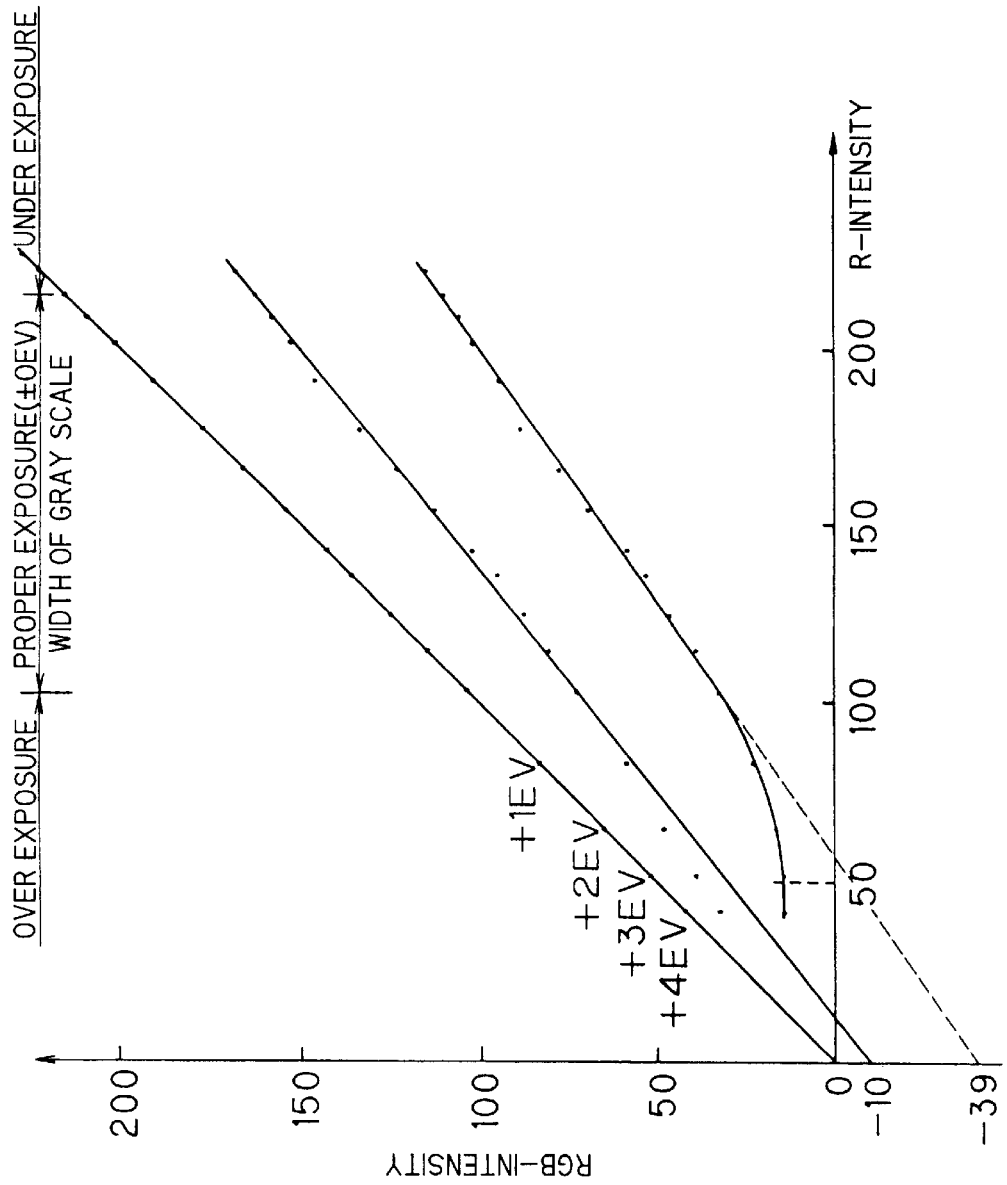
FIG. 5 is a graph for describing a process for performing a predetermined measurement on a negative film of a particular brand and finding a gray line.

FIG. 5 is a graph for specifically describing a process for performing a predetermined measurement on a negative film of a particular brand and finding a gray line. In this graph, an R-value which serves as a reference is measured along the horizontal axis, while RGB-values are measured along the vertical axis. The RGB-values are quantized in eight bits and read, and therefore, appear theoretically as integer values within a range from 0 to 255 in the graph. Although three gray lines are shown in FIG. 5, they are RR-, RB- and RG-projections of a single gray line in a three dimensional color space as understood from FIG. 9. The situation is also applied to FIG. 8 (described later).

Specific conditions under which a measurement result shown in the graph was obtained are as follows. A gray scale was irradiated with illumination light of a color temperature which was designated as standard for an objective negative film of a particular brand (about 5,000 K for a day light type). The gray scale was then photographed with an exposure quantity which was designated as standard for the negative film of the particular brand, as well as in an overexposure and an underexposure conditions. The exposed negative film was thereafter developed by a designated process. Next, the image inputting part 10 separated an image which was recorded on the negative film into three colors of R, G and B, thereby obtaining image data which represent digital intensity values in R, G and B. The image analysis part 30 sampled the image data at appropriate brightness intervals, and accordingly found which graduated RGB-values the gray line extending from the brightest white to the darkest black which were photographed on the negative film had. A result was then saved in the information holding part 40.

The image analysis part 30 established necessary conversion formulas based on actual measurements of the RGB-values which are shown in the graph above. The following was found as gray conversion formulas for calculating expected R-intensity values IR' and IR" which correspond to points on the gray scale, from optional G- and B-intensity values IG and IB:

$$IR'=1.250IG+12.5 \quad (1)$$

$$IR''=1.429IB+56 \quad (2)$$

The coefficients above were determined by linear approximation using the least square method.

Further, gray conversion formulas for calculating expected G- and B-intensity values IG' and IB' which correspond to points on the gray scale were established from an optional R-intensity value IR:

$$IG'=0.81IR-10 \quad (3)$$

$$IB'=0.71IR-39 \quad (4)$$

In an overexposure condition (i.e., where IR $\leq$ 104), since the relationships for IR and IB largely deviate respectively from the formulas (2) and (4) above, if approximated by a quadratic curve, the relationships become:

$$IR''=50+((IB-13)/0.0072)^{1/2} \quad (5)$$

$$IB'=0.0072(IR-50)^2+13 \quad (6)$$

in the ranges of IR >50 and IB >13.

Referring to FIG. 4 again, a description will be given on procedures for converting image data of a negative image into image data of a positive image based on data which are related to a gray line which is prepared as shown in FIG. 3 according to the first preferred embodiment.

First, at Step S21, a negative film which is to be inverted is prepared. The image inputting part 10 reads a negative image of the negative film, and the image holding part 20 stores the negative image as image data. On a negative film which is to be read, in principle, an object is photographed under standard illumination which is designated for the brand of the negative film, and the negative film is developed by a standard process which is designated for that brand.

Next, at Step S22, the image analysis part 30 finds a pair of candidates (a first HP candidate and a second HP candidate) appropriate as an HP on the negative image, from the image data of the negative image which are obtained at Step S21.

More precisely, first, among pixels on the negative image of the negative film which is to be inverted, pixels at which the sum of RGB-values is approximately minimum are identified, and image data at these pixels are stored as a first highlight data candidate (hereinafter "a first HD candidate") which corresponds to the first HP candidate. Following this, minimum values of pixel data of the negative image are obtained for planes of the respective colors, and one set of RGB-values are stored as a second highlight data candidate which corresponds to the second HP candidate.

During identification of the first HP candidate, instead of a pixel at which the sum of RGB-values is completely minimum, a plurality of pixels at which the sum of RGB-values is close to minimum are identified as the first HP candidate, thereby identifying the first HP candidate somewhat more moderately. The reason is that when the first HP candidate is identified as a pixel at which the sum of RGB-values is the smallest, such a first HP candidate may correspond to a pixel which is inappropriate as an HP, such as a fine scar or dirt on the film. To avoid an adverse affect of such, pixels in a range of about 0.5% from the pixel at which the sum of RGB-values is the smallest are ignored. Instead, an average of the RGB-values at pixels with the second smallest sum which are in the range of about 0.5% is used as the first HP candidate. Whether the first HP candidate is appropriate as highlight data is then judged, which permits to obtain a good result in reality. Although the brightest pixels of 0.5% are ignored, the first HP candidate belongs to the brightest 1.0% region of the negative image.

Next, at Step S23, the image analysis part 30 determines whether the RGB-values of the first HP candidate (which is the first HD candidate) obtained at Step S22 described above are close to the gray line.

To judge whether these RGB-values are close to the gray line, the gray conversion formulas established at Step S11 to Step S13 shown in FIG. 3 (namely, the formulas (1) and (2)) are used. That is, the intensity values IG and IB of the first HP candidate obtained at Step S22 described above are substituted in the formulas (1) and (2). Following this, a maximum value and a minimum value are found among the calculated expected intensity values IR' and IR" and the actual intensity value IR, and depending on a deviation of a ratio between the maximum value and the minimum value from 1, whether the RGB-values of the HP candidate are close to the gray line to a certain extent and therefore can be regarded as gray or far from the gray line and therefore can be regarded as a tint to a certain extent (i.e., a vivid chromatic color) is judged.

When it is judged at Step S23 that the RGB-values of the first HP candidate (which is the first HD candidate) are approximately on the gray line, the sequence proceeds to Step S25. Conversely, when it is judged at Step S23 that the RGB-values of the first HP candidate are far from the gray line, the sequence proceeds to Step S24.

At Step S24, the image analysis part 30 judges whether the RGB-values of the second HP candidate obtained at Step S22 described above (which is the second HD candidate) are close to the gray line. A similar method to Step S23 is used to judge whether these RGB-values are close to the gray line. That is, the intensity values IG and IB of the second HP candidate are substituted in the formulas (1) and (2) described above. Following this, a maximum value and a minimum value are found among the calculated expected intensity values IR' and IR" and the actual intensity value IR, and whether a ratio between the maximum value and the minimum value deviates from 1 is judged.

When it is judged at Step S24 that the RGB-values of the second HP candidate (which is the second HD candidate) are approximately on the gray line, the sequence proceeds to Step S27. Conversely, when it is judged at Step S24 that the RGB-values of the second HP candidate are far from the gray line, the sequence proceeds to Step S25.

At Step S25, the first or the second HP candidate obtained at Step S22 is determined appropriate and used directly as an HP, and the corresponding first or second HD candidate is saved in the information holding part 40 as highlight data.

Next, at Step S26, the image analysis part 30 identifies an SP on the negative image, from the image data of the negative image which are obtained at Step S21.

More particularly, first, among pixels on the negative image of the negative film which is to be inverted, pixels at which the sum of RGB-values is approximately maximum, namely, a shadow point candidate (hereinafter an "SP candidate"), are identified, and whether the SP candidate is close to the gray line is judged. A similar method to Step S23 is used to judge whether these RGB-values are close to the gray line. That is, the RGB-values at the respective pixels which form the negative image are extracted from the image data which are obtained at Step S21, and an SP candidate for which the sum of the RGB-values which form the image data is approximately the largest is identified. Next, the intensity values IG and IB of the SP candidate are substituted in the formulas (1) and (2) described above. Following this, a maximum value and a minimum value are found among the calculated expected intensity values IR' and IR" and the actual intensity value IR, and whether a ratio between the maximum value and the minimum value deviates from 1 is judged.

When the SP candidate is close to the gray line, the SP candidate as it directly is used as an SP, and the RGB-values of the SP candidate are saved in the information holding part 40 as shadow data. Conversely, when the SP candidate is far from the gray line, maximum values of pixel data of the negative image are obtained for the planes of the respective colors R, G and B, and by a method similar to the above, whether one set of the RGB-values (i.e., the SPs for the respective planes) are close to the gray line is judged. If combination of the SPs which are obtained for the respective planes is close to the gray line, the combination of the RGB-values is saved in the information holding part 40 as shadow data of the negative image.

On the other hand, at Step S27, determining that the first and the second HP candidates which are identified at Step S22 are inappropriate, imaginary highlight data and imaginary shadow data are found from the RGB-values of images which correspond to a white color region and a black color region of the gray scale which is photographed for establishing the gray conversion formulas which are shown in FIG. 3, and the imaginary highlight data and the imaginary shadow data are saved in the information holding part 40 as an imaginary HP and an imaginary SP. More particularly, while the gray scale is photographed under standard exposure at Step S11 shown in FIG. 3, it is considered that in the image of the negative film which is obtained by developing the gray scale through a standard process, there are two sets of RGB-values which correspond respectively to the white color region which is the brightest and the black color region which is the darkest of the gray scale, and that it is possible to obtain, from the two sets of RGB-values, two sets of image data, i.e., bright image data and dark image data, which represent achromatic colors, independently of the nature of an object. Such two sets of the image data of bright image data and dark image data are adopted as the imaginary highlight data and the imaginary shadow data, respectively, and saved in the information holding part 40.

At last, at Step S28, the image analysis part 30 establishes, for the respective colors, such intensity conversion formulas of direct functions with which highlight data of the negative image as it is before inverted are converted into a maximum value of image data of a positive image as it is before inverted and shadow data of the negative image are converted into a minimum value of the image data of the positive image. The image conversion part 50 executes data conversion which applies the intensity conversion formulas to the data of the respective pixels of the negative image, and the image outputting part 60 prints a positive image which is obtained as a result of the data conversion.

Now, a specific example of determination of an HP and an SP and negative-to-positive inversion will be described. It is assumed that an object is formed by color planes of two colors of red and yellow. In this case, RGB-values of a negative image of the red color plane are (98, 149, 99) and RGB-values of the negative image of the yellow color plane are (93, 79, 96), for instance.

A first HD candidate is:

IR(REP)=93, IG(REP)=79, IB(REP)=96 which correspond to the yellow color plane, as is clear from the foregoing related to Step S22 shown in FIG. 4. The sum of the RGB-values in the red color plane is 346, while the sum of the RGB-values in the yellow color plane is 268. Of these, the smallest value is with the yellow color plane, and therefore, the yellow color plane is selected as the first HP candidate on the negative film.

On the other hand, a second HD candidate is:

IR (Min)=93, IG(Min)=79, IB(Min)=96 which correspond to the red color plane, as is clear from the foregoing related to Step S22 shown in FIG. 4. Thus, the second HD candidate coincides with the first HD candidate.

Next, as described in relation to Step S23 and Step S24 shown in FIG. 4, whether the first and the second HD candidates are close to the gray line is judged. Here, since IR=IR(REP)=IR(Min)=93, assuming that:

IG=IG(REP)=IG(Min)=79 and

IB=IB(REP)=IB(Min)=96 in the formulas (1) and (5), expected intensity values in R are obtained as follows:

IR'=1.25×79+12.5=111

IR"=50+((96−13)/0.0072)$^{1/2}$=157

Of the intensity value IR and the expected intensity values IR' and IR", a ratio of the maximum to the minimum is 157/93=1.69. This HP candidate is judged as being far from the gray line, and therefore, is not used. An HP candidate which is determined as being close to a gray line is an HP candidate with the ratio in the range of about 1.0 to 1.2.

Next, as described in relation to Step S27 shown in FIG. 4, from RGB-values of images which correspond to a white color region and a black color region of the gray scale, imaginary highlight data and imaginary shadow data are found. For instance, RGB-values of an image in the white color region are (216, 163, 110) and RGB-values of an image in the black color region are (104, 72, 31).

As described above, utilizing the RGB-values of the images which correspond to the white color region and the black color region of the gray scale, under a condition that RGB-values of an HP on a positive image as it is after converted are equally 245 and that RGB-values of an SP on the positive image are equally 20, the following linear transformation formulas are obtained:

As the linear transformation formula regarding R for negative-to-positive inversion, IRp=454−(225/(216−104))×IR          (7)

As the linear transformation formula regarding G for negative-to-positive inversion, IGp=480−(225/(163−72))×IG          (8)

As the linear transformation formula regarding B for negative-to-positive inversion, IBp=342−(225/(110−31))×IB          (9)

Figure 10:
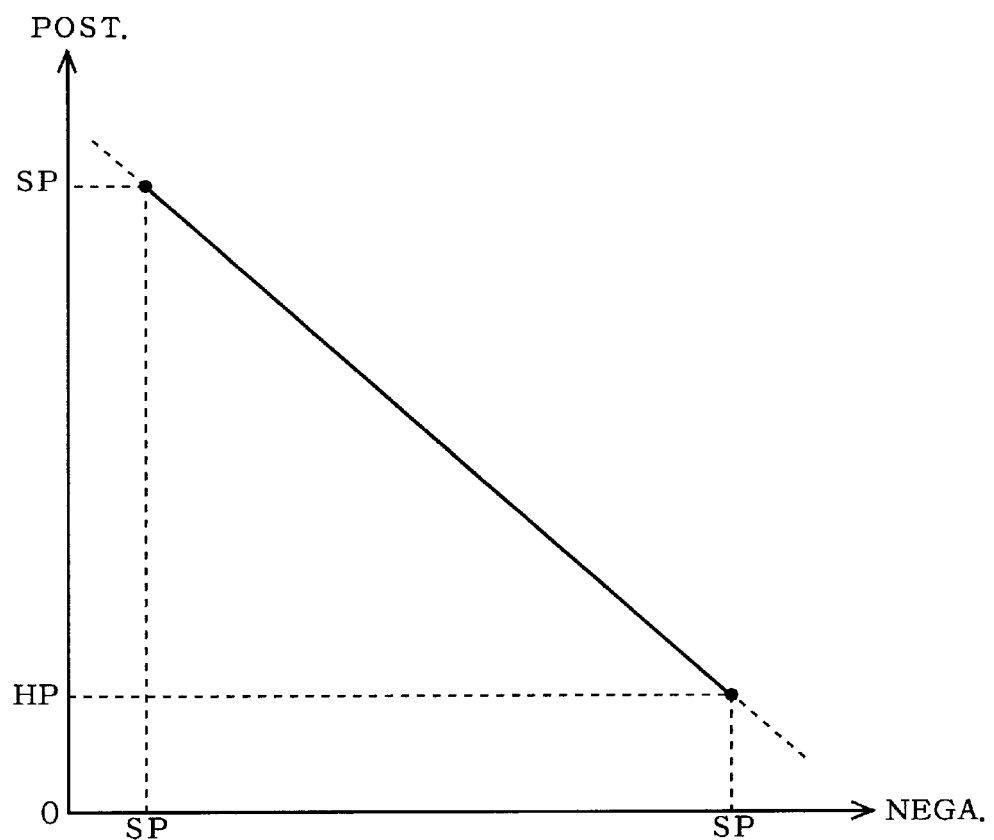
FIG. 10 represents an example of a negative/positive conversion line.

The values IRp, IGp and IBp are RGB-values on a positive image as it is after converted. An example of the conversion line is shown in FIG. 10.

As the RGB-values (98, 149, 99) the red color plane has on the negative image are substituted in the formulas (7), (8) and (9) above, values IRp=258, IGp=58, IBp=51 are obtained and a proper red color is reproduced on a positive image, as understood from the foregoing. As the RGB-values (93, 79, 96) the yellow color plane has on the negative image are substituted in the formulas (7), (8) and (9) above, values IRp=268, IGp=229, IBp=59 are obtained and a proper yellow color is reproduced on the positive image, as understood from the foregoing. In the preferred embodiment above, although IRp=258 holds with respect to the red color plane and IRp=268 holds with respect to the yellow color plane, these values are each normalized and used as the value 255.

For information, the following will describe an example of negative-to-positive inversion where a minimum value and a maximum value of a negative image are obtained for each one of the R-, G- and B-planes and the two sets of the RGB-values are directly used as an HP and an SP without referring to a gray line. In an object (having two color planes of red and yellow) which is similar to the object described above in relation to the preferred embodiment above, intensity values of an HP on a negative image are as follows for the respective planes:

IR (Min)=93, IG(Min)=79, IB(Min)=96

Utilizing the values described above as they directly are, intensity values of an SP on the negative image are as follows:

IR (Max)=98, IG(Max)=149, IB(Max)=99

The HP on a positive image is equally 245 for R, G and B, and the SP on the positive image is equally 20 for R, G and B.

From the conditions above, the following is obtained:

As a linear transformation formula regarding R for negative-to-positive inversion, IRp=4430−45IR      (10)

As a linear transformation formula regarding G for negative-to-positive inversion, IGp=448−3.142IG      (11)

As a linear transformation formula regarding B for negative-to-positive inversion, IBp=7445−75IB      (12)

It is understood that as the RGB-values (98, 149, 99) of the red color plane on the negative image are substituted in the formulas above, RGB-values on a positive image are (20, 20, 20) so that a black color is reproduced instead of a red color. Further, it is understood that as the RGB-values (98, 149, 99) of the yellow color plane on the negative image are substituted in the formulas above, RGB-values on a positive image are (245, 245, 245) so that a white color is reproduced instead of a yellow color.

<2. Second Preferred Embodiment>

Next, image processing performed by the image processing apparatus 100 according to a second preferred embodiment will be described.

Image processing according to the second preferred embodiment is the same as the procedures shown in FIG. 3 for establishing conversion formulas for R, G and B in relation to a gray line and some formulas obtained in the procedures according to the first preferred embodiment, and therefore, will not be described.

Figure 6:
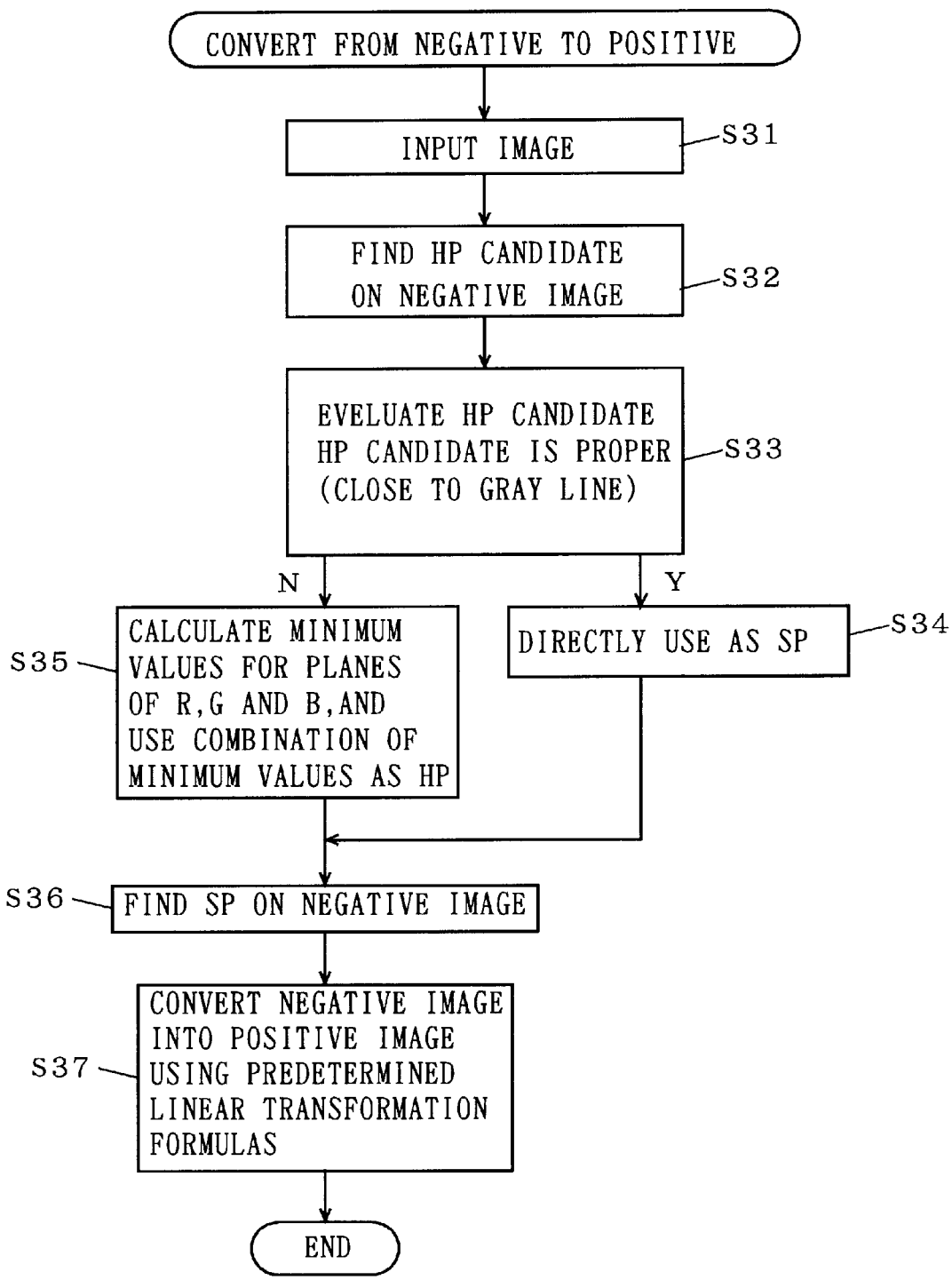
FIG. 6 is a flowchart for converting image data of a negative image into image data of a positive image according to a second preferred embodiment of the present invention.

FIG. 6 shows procedures for converting image data of a negative image into image data of a positive image according to the second preferred embodiment. The following will describe procedures for converting image data of a negative image into image data of a positive image based on data regarding a gray line which are prepared as shown in FIG. 3 in the second preferred embodiment.

First, at Step S31, a negative film which is to be inverted is prepared. The image inputting part 10 reads a negative image of the negative film, and the image holding part 20 stores the negative image as image data. On a negative film which is to be read, in principle, an object is photographed under standard illumination which is designated for the brand of the negative film, and the negative film is developed by a standard process which is designated for that brand.

Next, at Step S32, the image analysis part 30 identifies a candidate which is proper as an HP on the negative image, from the image data of the negative image which are obtained at Step S31 (hereinafter an "HP candidate").

More precisely, among pixels on the negative image of the negative film which is to be inverted, pixels at which the sum of RGB-values is approximately minimum are identified as HP candidates. The second preferred embodiment requires that a plurality of pixels at which the sum of RGB-values is close to minimum are identified as the HP candidate, thereby identifying the HP candidate somewhat more moderately, instead of identifying a pixel at which the sum of RGB-values is completely minimum. The reason is that when an HP candidate is defined as a pixel at which the sum of RGB-values is the smallest, such an HP candidate may correspond to a pixel which is inappropriate as an HP, such as a fine scar or dirt on the film. To avoid an adverse affect of such, pixels in a range of about 0.5% from the pixel at which the sum of RGB-values is the smallest are ignored. Instead, pixels with the second smallest sum which are in the range of about 0.5% are used as the HP candidate. Judging whether an average of the RGB-values at the HP candidate is appropriate as highlight data, a good result is obtained in reality.

Next, at Step S33, the image analysis part 30 determines whether the RGB-values of the HP candidate which is obtained at Step S32 described above are close to the gray line.

To judge whether the RGB-values are close to the gray line, the gray conversion formulas established at Step S11 to Step S13 which are shown in FIG. 3 (namely, the formulas (1) and (2)) are used. That is, the intensity values IG and IB of the HP candidate which is obtained at Step S32 described above are substituted in the formulas (1) and (2). Following this, a maximum value and a minimum value are found among the calculated expected intensity values IR' and IR" and the actual intensity value IR, and depending on a deviation of a ratio between the maximum value and the minimum value from 1, whether the RGB-values of the HP candidate are close to the gray line to a certain extent and therefore can be regarded as gray or far from the gray line and therefore can be regarded as a tint to a certain extent (i.e., a vivid chromatic color) is judged.

When it is judged at Step S33 that the RGB-values of the HP candidate are approximately on the gray line, the sequence proceeds to Step S34. Conversely, when it is judged at Step S33 that the RGB-values of the HP candidate are far from the gray line, the sequence proceeds to Step S35.

At Step S34, the HP candidate which is obtained at Step S32 is determined appropriate and directly used as an HP, and the RGB-values of this HP are saved in the information holding part 40 as highlight data.

At Step S35, determining that the HP candidate which is obtained at Step S32 is inappropriate, minimum values of pixel data of the negative image are obtained for the planes of the respective colors of R, G and B, and by a method similar to the above, whether one set of the RGB-values (i.e., HPs for the respective planes) are close to the gray line is judged. If combination of the HPs which are obtained for the respective planes is close to the gray line, the combination of the RGB-values is saved in the information holding part 40 as highlight data of the negative image.

Next, at Step S36, the image analysis part 30 identifies an SP on the negative image, from the image data of the negative image which are obtained at Step S31.

More particularly, first, among pixels on the negative image of the negative film which is to be inverted, pixels at which the sum of RGB-values is approximately maximum, namely, a shadow point candidate (hereinafter an "SP candidate") are identified, and whether the SP candidate is close to the gray line is judged. A similar method to Step S33 is used to judge whether these RGB-values are close to the gray line. That is, the RGB-values at the respective pixels which form the negative image are extracted from the image data which are obtained at Step S31, and an SP candidate for which the sum of the RGB-values which form the pixel data is approximately the largest is identified. Next, the intensity values IG and IB of the SP candidate are substituted in the formulas (1) and (2) described earlier. Following this, a maximum value and a minimum value are found among the calculated expected intensity values IR' and IR" and the actual intensity value IR, and whether a ratio between the maximum value and the minimum value deviates from 1 is judged.

When the SP candidate is close to the gray line, the SP candidate as it directly is used as an SP, and the RGB-values of the SP candidate are saved in the information holding part 40 as shadow data. Conversely, when the SP candidate is far from the gray line, maximum values of the pixel data of the negative image are obtained for the planes of the respective colors R, G and B, and by a method similar to the above, whether one set of the RGB-values (i.e., the SPs for the respective planes) are close to the gray line is judged. If combination of the SPs which are obtained for the respective planes is close to the gray line, the combination of the RGB-values is saved in the information holding part 40 as shadow data of the negative image.

At last, at Step S37, the image analysis part 30 establishes, for the respective colors, such intensity conversion formulas of direct functions with which highlight data of the negative image as it is before inverted are converted into a maximum value of image data of a positive image as it is before inverted and shadow data of the negative image are converted into a minimum value of the image data of the positive image. The image conversion part 50 executes data conversion which applies the intensity conversion formulas to the data of the respective pixels of the negative image, and the image outputting part 60 prints a positive image which is obtained as a result of the data conversion.

Now, a specific example of determination of an HP and negative-to-positive inversion will be described. It is assumed that an object is formed by color planes of three colors of white, blue and yellow. In this case, RGB-values of a negative image in the white color plane are (99, 68, 29), RGB-values of the negative image in the blue color plane are (205, 133, 13), and RGB-values of the negative image in the yellow color plane are (93, 79, 96), for instance.

RGB-values of an HP candidate are:

$$IR (WHP)=99, IG(WHP)=68, IB(WHP)=29$$

which correspond to the white color plane, as is clear from the foregoing related to Step S32 shown in FIG. 6. The sum of the RGB-values in the white color plane is 196, the sum of the RGB-values in the blue color plane is 351, and the sum of the RGB-values in the yellow color plane is 268. Of these, the smallest value is with the white color plane, and therefore, the white color plane is selected as the HP candidate on the negative film.

Next, as described in relation to Step S33 shown in FIG. 6, whether the HD candidate on the negative film is close to the gray line is judged. Since IR (WHP)=93, IG=IG(WHP) and IB=IB(WHP) in the formulas (1) and (5), and therefore, expected intensity values of R are obtained as follows:

$$IR'=1.25 \times 68+12.5=97.5$$

$$IR"=50+((29-13)/0.0072)^{1/2}=97$$

Of the intensity value IR and the expected intensity values IR' and IR", a ratio of the maximum to the minimum is 97.5/93=1.05. This HP candidate is judged as being close to the gray line, and therefore, is used as an HP on the negative image. That is, the values (99, 68, 29) in the white color plane are obtained as RGB-values of an HP on the negative image (i.e., highlight data). An HP candidate which is determined as being close to a gray line is an HP candidate with the ratio in the range of about 1.0 to 1.2.

On the other hand, RGB-values of an SP on the negative image (i.e., shadow data) are:

$$IR (Max)=205, IG(Max)=133, IB(Max)=96$$

with respect to the respective planes. A detailed description on this will be omitted.

As described above, considering that the highlight data are (99, 68, 29) and the shadow data are (205, 133, 96), under a condition that RGB-values of an HP on a positive image as it is after converted are equally 245 and that RGB-values of an SP on the positive image are equally 20, the following linear transformation formulas are obtained:

As the linear transformation formula regarding R for negative-to-positive inversion, $$IRp=455-(225/(205-99)) \times IR \qquad (13)$$

As the linear transformation formula regarding G for negative-to-positive inversion, $$IGp=480-(225/(133-68)) \times IG \qquad (14)$$

As the linear transformation formula regarding B for negative-to-positive inversion, $$IBp=342-(225/(96-29)) \times IB \qquad (15)$$

The values IRp, IGp and IBp are RGB-values on a positive image as it is after converted.

As the RGB-values the white color plane has on the negative image are substituted in the formulas (13), (14) and (15) above, values IRp=245, IGp=245, IBp=245 are obtained and a proper white color is reproduced on a positive image, as understood from the foregoing.

For information, the following will describe an example of negative-to-positive inversion where a minimum value and a maximum value of a negative image are obtained for each one of the R-, G- and B-planes and the two sets of the RGB-values are directly used as an HP and an SP without referring to a gray line. In an object (having three color planes of white, blue and yellow) which is similar to the object described above in relation to the preferred embodiment above, intensity values of an HP on a negative image are as follows for the respective planes:

IR (Min)=89, IG(Min)=60, IB(Min)=28

Utilizing the values described above as they directly are, intensity values of an SP on the negative image are as follows:

IR (Max)=205, IG(Max)=133, IB(Max)=96

The HP on a positive image is equally 245 with respect to R, G and B, and the SP on the positive image is equally 20 with respect to R, G and B.

From the conditions above, the following is obtained:

As a linear transformation formula regarding R for negative-to-positive inversion, $$IRp=432-2.009IR \tag{16}$$

As a linear transformation formula regarding G for negative-to-positive inversion, $$IGp=480-3.46IG \tag{17}$$

As a linear transformation formula regarding B for negative-to-positive inversion, $$IBp=280-2.70IB \tag{18}$$

It is understood that as the RGB-values (99, 68, 29) in the white color plane on the negative image are substituted in the formulas above, RGB-values on a positive image are (233, 245, 201), so that the white color plane fails to be reproduced as a pure white color. In other words, the color plane of the white color in the object, after photographed on the negative film, read by a scanner or the like, and converted into a positive image, becomes a greenish yellow color, whereby a resultant positive image is largely different from the original object.

<3. Third Preferred Embodiment>

Next, image processing performed by the image processing apparatus 100 according to a third preferred embodiment will be described.

Image processing according to the third preferred embodiment as well is the same as the procedures shown in FIG. 3 before establishing conversion formulas for R, G and B in relation to a gray line according to the first preferred embodiment, and therefore, will not be described.

Figure 8:
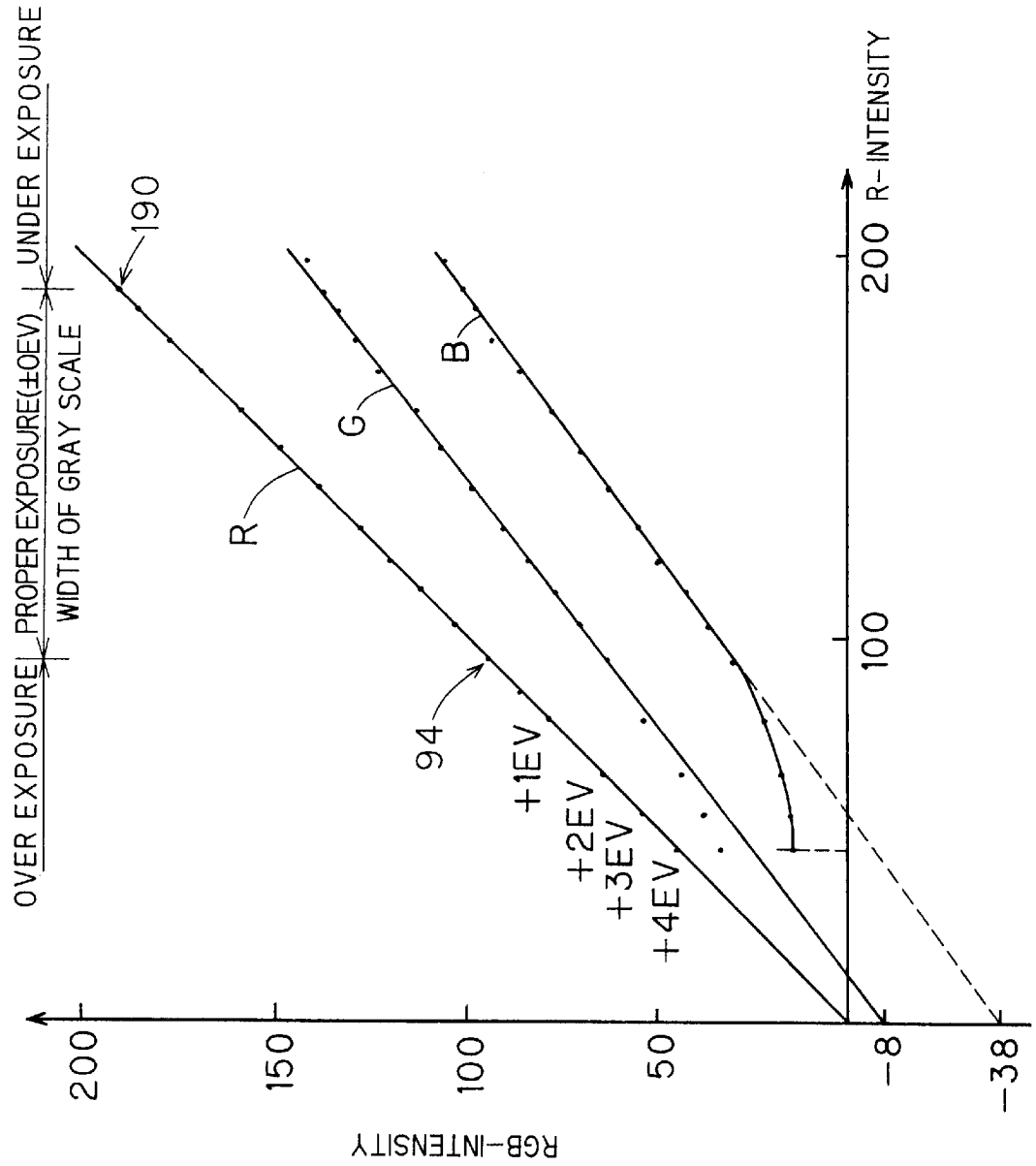
FIG. 8 is a graph for describing a process for performing a predetermined measurement on a negative film of a particular brand and finding a gray line.
Figure 9:
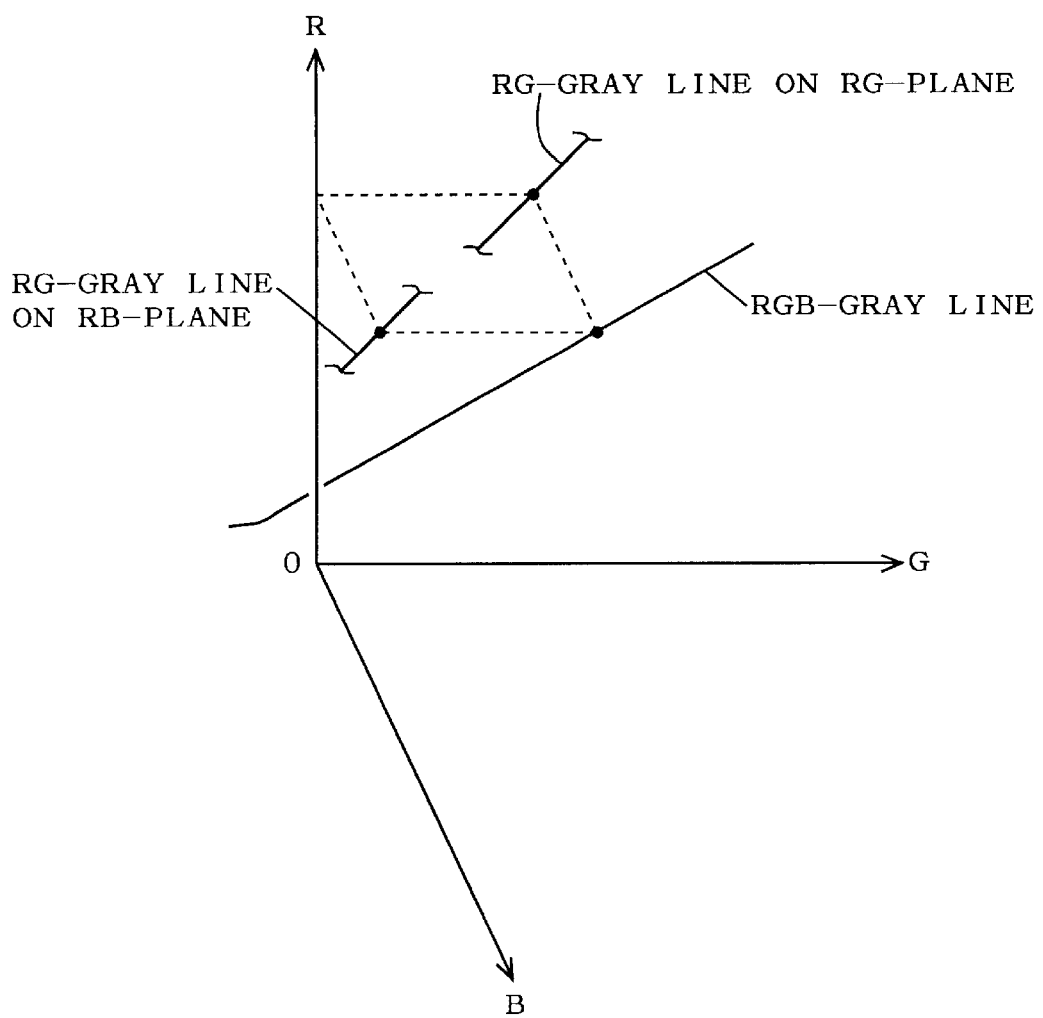
FIG. 9 is a graph representing a relation between a gray line in a three dimensional color space a nd respective gray lines in RB and RG color planes.

FIG. 8 is a graph for specifically describing a process according to the third preferred embodiment for performing a predetermined measurement on a negative film of a particular brand and finding a gray line. In the graph, an R-value which serves as a reference is measured along the horizontal axis, while RGB-values are measured along the vertical axis. The RGB-values are quantized in eight bits and read, and therefore, appear theoretically as integer values within a range from 0 to 255 in the graph.

Specific conditions under which a measurement result shown in the graph was obtained are as follows. A gray scale was irradiated with illumination light of a color temperature which was designated as standard for an objective negative film of a particular brand (about 5,000 K for a day light type). The gray scale was then photographed with an exposure quantity which was designated as standard for the negative film of the particular brand, as well as in an overexposure and an underexposure conditions. The exposed negative film was thereafter developed by a designated process. Next, the image inputting part 10 separated an image which was recorded on the negative film into three colors of R, G and B, thereby obtaining image data which represent digital intensity values in R, G and B. The image analysis part 30 sampled the image data at appropriate brightness intervals, and accordingly found which graduated RGB-values the gray line extending from the brightest white to the darkest black which were photographed on the negative film had. A result was then saved in the information holding part 40. However, in the third preferred embodiment, the graph of FIG. 8 is different from the graph of FIG. 5 in that it is adapted to determine a shadow point.

The image analysis part 30 established necessary conversion formulas based on actual measurements of the RGB-values which are shown in the graph above. The following was found as gray conversion formulas for calculating expected R-intensity values IR' and IR" which correspond to points on the gray line, from optional G- and B-intensity values IG and IB:

$$IR'=1.31\ 6IG+10.5 \tag{19}$$

$$IR"=1.389IB+52.8 \tag{20}$$

The coefficients above were determined by linear approximation using the least square method.

Further, gray conversion formulas for calculating expected G- and B-intensity values IG' and IB' which correspond to points on the gray line were established, from an optional R-intensity value IR:

$$IG'=0.76IR-8 \tag{21}$$

$$IB'=0.72IR-38 \tag{22}$$

In an overexposure condition, since the relationships for IR and IB largely deviate respectively from the formulas (20) and (22) described above, if approximated by a quadratic curve, the relationships become:

$$IR"=50+((IB-15)/0.0077479)^{1/2} \tag{23}$$

$$IB'=0.0077479\ (IR-50)^2+15 \tag{24}$$

in the ranges of IR>50 and IB>15.

Figure 7:
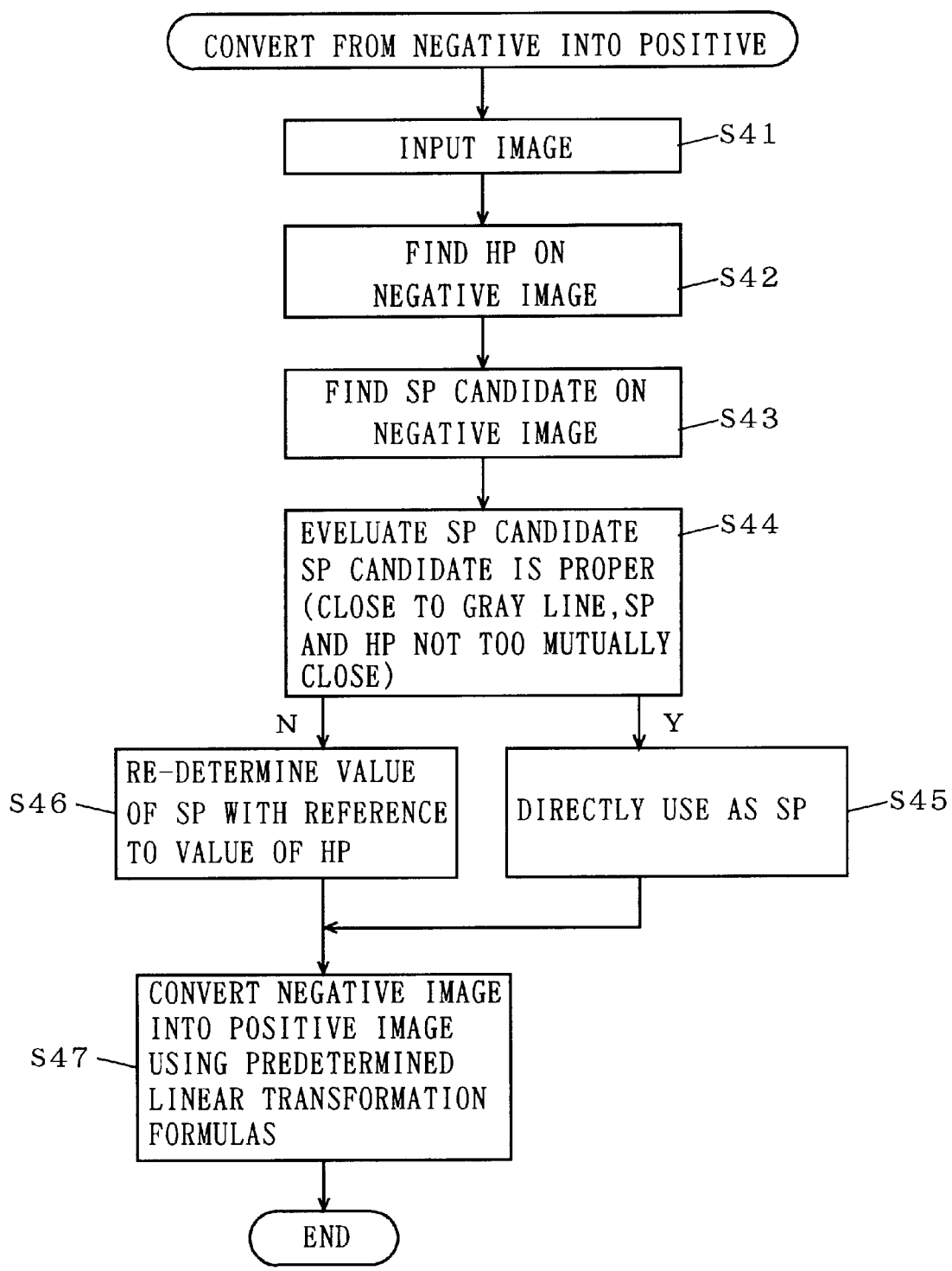
FIG. 7 is a flowchart for converting image data of a negative image into image data of a positive image according to a third preferred embodiment of the present invention.

Referring to FIG. 7 again, a description will be given on procedures for converting image data of a negative image into image data of a positive image based on data which are related to a gray line which is prepared as shown in FIG. 3.

First, at Step S41, a negative film which is to be inverted is prepared. The image inputting part 10 reads a negative image of the negative film, and the image holding part 20 stores the negative image as image data. On a negative film which is to be read, in principle, an object is photographed under standard illumination which is designated for the brand of the negative film, and the negative film is developed by a standard process which is designated for that brand.

Next, at Step S42, the image analysis part 30 finds an HP on the negative image, from the image data of the negative image which are obtained at Step S41.

More precisely, among pixels on the negative image of the negative film which is to be inverted, pixels at which the sum of RGB-values is approximately minimum are identified and determined as a candidate of an HP (hereinafter an "HP candidate"). Whether RGB-values of the HP candidate (pixel data) are close to the gray line is judged. To judge whether the RGB-values are close to the gray line, the gray conversion formulas established at Step S11 to Step S13 which are shown in FIG. 3 (namely, the formulas (19) and (20) above) are used. That is, the RGB-values at the respective pixels which form the negative image are extracted from the image data which are obtained at Step S41, and an HP candidate for which the sum of the RGB-values which form the pixel data is minimum is identified. Next, the intensity values IG and IB of the HP candidate are substituted in the formulas (19) and (20). Following this, a maximum value and a minimum value are found among the calculated expected intensity values IR' and IR" and the actual intensity value IR, and depending on a deviation of a ratio between the maximum value and the minimum value from 1, whether the RGB-values of the HP candidate are close to the gray line to a certain extent and therefore can be regarded as gray or far from the gray line and therefore can be regarded as a tint to a certain extent (i.e., a vivid chromatic color) is judged.

If the HP candidate is close to the gray line, this HP candidate as it directly is used as an HP, and the RGB-values of the HP candidate are saved in the information holding part 40 as highlight data.

Conversely, when the HP candidate is far from the gray line, minimum values of the pixel data of the negative image are obtained for the planes of the respective colors R, G and B, and by a method similar to the above, whether one set of the RGB-values (i.e., the HPs for the respective planes) are close to the gray line is judged. If combination of the HPs which are obtained for the respective planes is close to the gray line, the combination of the RGB-values is saved in the information holding part 40 as highlight data of the negative image.

Next, at Step S43, the image analysis part 30 identifies a candidate which is proper as an SP (hereinafter an "SP candidate") on the negative image, from the image data of the negative image which are obtained at Step S41.

More particularly, first, among pixels on the negative image of the negative film which is to be inverted, pixels at which the sum of RGB-values is approximately maximum are identified determined as an SP candidate. The third preferred embodiment requires that a plurality of pixels at which the sum of RGB-values is close to maximum are identified as the SP candidate, thereby identifying the SP candidate somewhat more moderately, instead of identifying a pixel at which the sum of RGB-values is completely maximum. The reason is that when an SP candidate is defined as a pixel at which the sum of RGB-values is the largest, such an SP candidate may correspond to a pixel which is inappropriate as an SP, such as a fine scar or dirt on the film. To avoid an adverse affect of such, pixels in a range of about 0.5% from the pixel at which the sum of RGB-values is the largest are ignored. Instead, pixels with the second largest sum which are in the range of about 0.5% are used as the SP candidate. Judging whether an average of the RGB-values of these SP candidate is appropriate as shadow data, a good result is obtained in reality. Although the darkest pixels of 0.5% are ignored, the SP candidate belongs to the 1.0% darkest region of the negative image.

Next, at Step S44, the image analysis part 30 judges whether the RGB-values of the SP candidate which is identified at Step S43 described above are close to the gray line and whether these RGB-values are too close to the RGB-values of the HP which is identified at Step S42 described above.

The judgment method regarding an HP described earlier in relation to Step S42 is used to judge whether these RGB-values of the SP candidate are close to the gray line, a detailed description on the judgment method will be omitted.

Whether these RGB-values of the SP candidate are too close to the RGB-values of the HP is judged using the image data regarding the gray scale which are measured at Step S11 and Step S12 shown in FIG. 3. That is, a difference in an R-value between two images which are formed on a reference negative film in correspondence to the brightest white patch and the darkest black patch in the gray scale which is photographed under a proper condition is compared with a difference in an R-value between the HP and the SP candidate on the negative image which are identified at Step S42 and Step S43 described above with respect to the negative film which is to be inverted. If the latter is remarkably smaller, it is judged that the SP candidate is too close to the HP. The reason for noting only the R-value of the RGB-values is because if it is confirmed in advance that both the HP and the SP candidate are close to the gray line, it is sufficient to compare with respect to only one element of the RGB-values. A further reason is that an R-intensity value among the three elements R, G and B changes over the largest range on a negative image, and therefore, an R-value realizes accurate judgment whether an HP and an SP candidate are too close to each other.

When it is judged at Step S44 that the RGB-values of the SP candidate are approximately on the gray line and have a sufficient difference from the RGB-values of the HP, the sequence proceeds to Step S45. When it is judged at Step S44 that the RGB-values of the SP candidate are far from the gray line or do not have a sufficient difference from the RGB-values of the HP, the sequence proceeds to Step S46.

At Step S45, the SP candidate which is identified at Step S43 as it directly is determined proper and used as an SP, and the RGB-values of this SP are saved in the information holding part 40 as shadow data.

At Step S46, determining that the SP candidate which is obtained at Step S43 is inappropriate, imaginary RGB-values which are desirable as an SP are found with reference to the RGB-values of the HP, and the imaginary RGB-values are saved in the information holding part 40 as shadow data. This shadow data are obtained by shifting the image data of the HP by an amount corresponding to a contrast of the gray scale, using the image data of the HP which is identified at Step S42 with respect to the negative film which is to be inverted and also using the image data which are measured at Step S11 and Step S12 with respect to the gray scale. More particularly, the image data of the HP are obtained at Step S42 with respect to the negative film which is to be inverted, and the image data of the brightest white patch and the darkest black patch in the gray scale which is photographed on the reference negative film are made available at Step S12. Of the RGB-values of the HP on the negative film which is to be inverted, the R-value is IR (HP). The R-values on the reference negative image in the brightest patch and the darkest patch on the negative film are IR (WP) and IR (BP). A difference in highlight (IR (HP)–IR (WP)) between the two negative films is added to IR (BP), thereby obtaining IR (SP) which is an imaginary R-intensity value of an SP which is to be found. The remaining two imaginary intensity values IG(SP) and IB (SP) of the SP which is to be found are obtained using the conversion formulas which are established at Step S11 to Step S13 shown in FIG. 3 (namely, the formulas (21), (22) and (23) described above).

At last, at Step S47, the image analysis part 30 establishes, for the respective colors, such intensity conversion formulas of direct functions with which highlight data of the negative image as it is before inverted are converted into a maximum value of image data of a positive image as it is before inverted and shadow data of the negative image are converted into a minimum value of the image data of the positive image. The image conversion part 50 executes data conversion which applies the intensity conversion formulas to the data of the respective pixels of the negative image, and the image outputting part 60 prints a positive image which is obtained as a result of the data conversion.

Now, a specific example of image conversion will be described. It is assumed that an object is formed by color planes of two colors of white and orange. In this case, RGB-values on a negative image of the white color plane are (89, 60, 28), and RGB-values on the negative image of the yellow color plane are (92, 94, 99), for instance.

RGB-values of an SP candidate on the negative image are:

$$IR(Max)=92, IG(Max)=94, IB(Max)=99$$

RGB-values of an HP candidate on the negative image are:

$$IR(Min)=89, IG(Min)=60, IB(Min)=28$$

Next, whether the HP candidate on the negative image is close to a gray line is judged. Since IR (Min)=89, IG=IG (Min) and IB=IB(Min) in the formulas (19) and (20), and therefore, expected intensity values of R are obtained as follows:

$$IR'=1.316 \times 60+10.5=89.4$$

$$IR''=1.389 \times 28+52.8=91.6$$

Of the intensity value IR and the expected intensity values IR' and IR", a ratio of the maximum to the minimum is 1.03. This value is judged sufficiently close to the gray line, and therefore, is used as an HP on the negative image. An HP candidate which is determined close to a gray line is an HP candidate with the ratio obtained in the manner above in the range of about 1.0 to 1.2.

Next, whether the SP candidate on the negative image is close to a gray line is judged. Since IR(Max)=92, IG=IG (Max) and IB=IB(Max) in the formulas (19) and (20), and therefore, expected intensity values of R are obtained as follows:

$$IR'=1.316 \times 94+10.5=134$$

$$IR''=1.389 \times 99+52.8=190$$

Of the intensity value IR and the expected intensity values IR' and IR", a ratio of the maximum to the minimum is 190/92=2.06. This SP candidate is judged far from the gray line, and therefore, is not used as an SP on the negative image.

In this case, the values of the SP are determined referring to the value for the HP. According to the graph in FIG. 8, R-intensity values on the negative image in the brightest patch and the darkest patch in the gray scale are 94 and 190, respectively (as denoted in the graph). Of pixel data of the identified HP, the R-intensity value IR (HP) is 89, while the R-intensity values IR (WP) and IR (BP) on the negative image in the brightest patch and the darkest patch are 94 and 190, respectively. Since a value (IR(HP)–IR(WP)) is added to the value IR (BP) and a resultant value is used as an R-intensity value of an SP which is to be found, IR (SP)=185 holds.

From the formulas described above, the remaining two elements IG(SP) and IB(SP) of the SP which is to be found are calculated as follows:

$$IG(SP)=0.76 \times IR(SP)-8=0.76 \times 185-8=132$$

$$IB(SP)=0.72 \times IR(SP)-38=0.72 \times 185-32=101$$

Hence, as RGB-values of the SP on the negative image, values (185, 132, 101) are obtained.

Although a detailed description will be omitted, considering that RGB-values of the HP on the negative image are (89, 60, 28), under a condition that RGB-values of an HP on a positive image as it is after converted are equally 245 and that RGB-values of an SP on the positive image is equally 20, the following linear transformation formulas are obtained:

As the linear transformation formula regarding R for negative-to-positive inversion, $$IRp=453-(225/(185-89)) \times IR \quad (25)$$

As the linear transformation formula regarding G for negative-to-positive inversion, $$IGp=432-(225/(132-60)) \times IG \quad (26)$$

As the linear transformation formula regarding B for negative-to-positive inversion, $$IBp=331-(225/(101-28)) \times IB \quad (27)$$

The values IRp, IGp and IBp are RGB-values on a positive image as it is after converted.

It then follows that if the RGB-values of the orange color plane on the negative image are substituted in the formulas (25), (26) and (27) above, values IRp=237, IGp=138, IBp=25 are obtained and a proper orange color is reproduced on a positive image.

For information, the following will describe an example of negative-to-positive inversion where a minimum value and a maximum value of a negative image are obtained for each one of the R-, G- and B-planes and the two sets of the RGB-values are directly used as an HP and an SP without referring to a gray line. In an object (having two color planes of white and orange) which is similar to the object described above in relation to the preferred embodiment above, RGB-values of a white color plane on the negative image are (89, 60, 28) while RGB-values of an orange color plane on the negative image are (92, 94, 99). Intensity values of an SP on the negative image are as follows:

$$IR(Max)=92, IG(Max)=94, IB(Max)=99$$

Utilizing the values described above as they directly are, intensity values of an SP on the negative image are as follows:

$$IR(Min)=89, IG(Min)=60, IB(Min)=28$$

The HP on a positive image is equally 245 with respect to R, G and B, and the SP on the positive image is equally 20 with respect to R, G and B.

From the conditions above, the following is obtained:

As a linear transformation formula regarding R for negative-to-positive inversion, $$IRp=6920-(225/3) \times IR \quad (28)$$

As a linear transformation formula regarding G for negative-to-positive inversion, $$IGp=642-(225/34) \times IG \quad (29)$$

As a linear transformation formula regarding B for negative-to-positive inversion, $$IB_p = 334 - (225/71) \times IB \tag{30}$$

If the RGB-values of the SP on the negative image are substituted in the respective formulas above, the RGB-values equally become 20 which is the values of the SP on the positive image. In other words, the color plane of an orange color in the object, after photographed on the negative film, read by a scanner or the like and converted into a positive image, becomes a black color (the RGB-values all being 20), whereby a resultant positive image is largely different from the original object.

<4. Modification>

While the present invention has been described in relation to the preferred embodiments above, the present invention is not limited to the preferred embodiments described above.

For example, in the second preferred embodiment, whether RGB-values of an HP candidate are close to a gray line is judged at Step S33 shown in FIG. 6, and if the HP candidate is far from the gray line, minimum values of a negative image are obtained for the planes of the respective colors and one set of the RGB-values are used as highlight data (Step S35). However, depending on a deviation of the HP candidate from the gray line, pixel data of the HP candidate may be synthesized, through proportional distribution, with image data which are obtained by combining one set of the RGB-values among minimum values which are calculated for the planes of the respective colors, to thereby determine highlight data. More specifically, where a is a ratio of a maximum value to a minimum value among the intensity value IR and the expected intensity values IR' and IR" which are obtained at Step S33 shown in FIG. 6, IR (Min), IG(Min) and IB(Min) are minimum intensity values for the planes of the respective colors, and IR (HR), IG(HR) and IB(HR) are intensity values of the HP candidate, the synthesized highlight data which are obtained as a result of proportional distribution are defined as follows, assuming that proportional distribution is executed with a proper coefficient β in a range of β>α−1:

$$IR(H) = ((\beta - \alpha + 1)/\beta)IR(HR) + ((\alpha - 1)/\beta)IR(Min)$$

$$IG(H) = ((\beta - \alpha + 1)/\beta)IG(HR) + ((\alpha - 1)/\beta)IG(Min)$$

$$IB(H) = ((\beta - \alpha + 1)/\beta)IB(HR) + ((\alpha - 1)/\beta)IB(Min)$$

In the range of β>α−1, instead of executing proportional distribution, only IR (Min), IG(Min) and IB(Min) are used.

Alternatively, the synthesized highlight data which are obtained as a result of proportional distribution are defined as follows:

$$IR(H) = (1/\alpha^n)IR(HR) + (1 - 1/\alpha^n)IR(Min)$$

$$IG(H) = (1/\alpha^n)IG(HR) + (1 - 1/\alpha^n)IG(Min)$$

$$IB(H) = (1/\alpha^n)IB(HR) + (1 - 1/\alpha^n)IB(Min)$$

The coefficient or mixing ratio n can be set to a proper positive value, by feeding back a result of negative-to-positive inversion or in other appropriate manner. It is to be noted that, if α=1, IR(H), IG(H) and IB(H) coincide with IR(HR), IG(HR) and IB(HR), respectively. In other words, the mixing process is substantially inactivated if the HP candidate is just on the gray line.

While the invention has been described in detail, the foregoing description is in all aspects illustrative and not restrictive. It is understood that numerous other modifications and variations can be devised without departing from the scope of the invention.

I claim:

1. A method of converting a negative image recorded on a negative image-recording medium into a positive image using a predetermined image-conversion rule said method comprising the steps of:
   (a) determining a gray condition defining achromatic colors on said negative image-recording medium;
   (b) determining a first combination of color components in a brightest region on said negative image;
   (c) determining whether or not said first combination of color components satisfies said gray condition;
   (d) determining said image-conversion rule using said first combination of color components if said first combination of color components satisfies said gray condition;
   (e) determining said image-conversion rule using an alternative combination of color components if said first combination of color components does not satisfy said gray condition; and
   (f) converting said negative image into a positive image using said image conversion rule;
   wherein the step (a) comprises the step of:
      (a-1) determining a gray reference line in a color coordinate space representing said gray condition; and
   the step (c) comprises the step of:
      (c-1) determining whether or not said first combination of color components is in a neighborhood of said gray reference line;
      wherein the step (c-1) comprises the step of:
         extracting a first color component from said first combination of color components to obtain a first value;
         extracting other color components from said first combination of color components;
         applying said other color components to gray reference line to obtain other values;
         determining a maximum value and a minimum value among said first value and said other values;
         calculating a value reflecting a difference between said maximum value and said minimum value; and
         comparing said value with a predetermined threshold value.

2. The method of claim 1, wherein
   the step b) comprises the steps of:
      b-1) finding one or more first pixels each of which has color components whose summation is nearly-minimum on said negative image; and
      b-2) determining said first combination of color components in response to respective color components of said first pixels.

3. The method of claim 2, wherein
   the step b-2) comprises the step of:
      obtaining an average of said first pixels for each color component to obtain said first combination of color components.

4. A method of converting a negative image recorded on a negative image-recording medium into a positive image using a predetermined image-conversion rule, said method comprising the steps of:
   (a) determining a gray condition defining achromatic colors on said negative image-recording medium;
   (b) determining a first combination of color components in a brightest region on said negative image;

(c) determining whether or not said first combination of color components satisfies said gray condition;

(d) determining said image-conversion rule using said first combination of color components if said first combination of color components satisfies said gray condition;

(e) determining said image-conversion rule using an alternative combination of color components if said first combination of color components does not satisfy said gray condition; and (f) converting said negative image into a positive image using said image-conversion rule;

wherein the step (a) comprises the step of:

(a-1) determining a gray reference line in a color coordinate space representing said gray condition; and the step (c) comprises the step of:

(c-1) determining whether or not said first combination of color components is in a neighborhood of said gray reference line;

wherein the step (d) comprises the step of:

(d-1) determining said image-conversion rule using said first combination of color components if said first combination of color components is on said gray reference line, and the step (e) comprises the steps of:

(e-1) determining respective minimum values of color components on said negative image;

(e-2) combining said respective minimum values of color components to obtain a second combination of color components; and (e-3) mixing said first and second combinations of color components with each other at a mixing ratio representing a shift of said first combination of color components from said gray reference line, to obtain said alternative combination of color components.

5. A method of converting a negative image recorded on a negative image-recording medium into a positive image using a predetermined image-recording medium into a positive image using a predetermined image-conversion rule said method comprising the steps of:

(a) determining a gray condition defining achromatic objects on said negative image-recording medium;

(b) determining a first combination of color components in a darkest region on said negative image;

(c) determining whether or not said first combination of color components satisfies said gray condition;

(d) determining said image-conversion rule using said first combination of color components if said first combination of color components satisfies said gray condition;

(e) determining said image-conversion rule using an alternative combination of color components if said first combination of color components does not satisfy said gray condition; and (f) converting said negative image into a positive image using said image conversion rule, further comprising the steps of:

(b') determining a second combination of color components representing a highlight point on said negative image, wherein the step (d) comprises the steps of:

(d-1) determining said image-conversion rule using said first and second combination of color components if said first combination of color components satisfies said gray condition and a difference between said first and second combinations of color components is larger than a predetermined threshold, and wherein the step (e) comprises the steps of:

(e-1) determining said image-conversion rule using an alternative combination of color components and said second combination of color components if said first combination of color components does not satisfy said gray condition or said difference between said first and second combinations of color components is smaller than said predetermined threshold.

6. The method of claim 5, wherein the step a) comprises the step of:

a-1) determining a gray reference line in a color coordinate space representing said gray condition, the step d-1) comprises the steps of:

determining whether or not said first combination of color components is in a neighborhood of said gray reference line; and obtaining said alternative combination of color components at a specific point determined on said gray reference line in response to said highlight point.

7. The method of claim 6, wherein the step d-1) further comprises the steps of:

comparing an one-component difference between said first and second combination of color components for a first color component; and comparing said one-component difference with a predetermined threshold difference.

8. The method of claim 6, wherein the step c) comprises the steps of:

extracting a first color component from said first combination of color components to obtain a first value;

extracting other color components from said first combination of color components;

applying said other color components to gray reference line to obtain other values;

determining a maximum value and a minimum value among said first value and said other values;

calculating a value reflecting a difference between said maximum value and said minimum value; and comparing said value with a predetermined threshold value.

* * * * *